United States Patent
Alejo Trevijano

(12) 
(10) Patent No.: US 6,288,741 B1
(45) Date of Patent: Sep. 11, 2001

(54) ELECTRONIC STEREOSCOPIC SYSTEM

(76) Inventor: Jose Javier Alejo Trevijano, Conde de Torrejón, 14 - 1ª planta- 41003 Seville (ES)

( * ) Notice: Subject to any disclaimer, the term of this patent is extended or adjusted under 35 U.S.C. 154(b) by 0 days.

(21) Appl. No.: 09/608,472

(22) Filed: Jun. 30, 2000

Related U.S. Application Data

(63) Continuation of application No. 08/894,970, filed as application No. PCT/ES97/00002 on Jan. 3, 1997.

(30) Foreign Application Priority Data

Jan. 5, 1996 (ES) .................................................... 9600023

(51) Int. Cl.[7] .................................................... H04N 13/00
(52) U.S. Cl. .................................................. 348/42; 345/87
(58) Field of Search .......................... 348/42, 49, 51–53, 348/55–56, 58–59; 345/6, 31, 52, 87, 96, 210; 349/96, 98, 5, 15, 61, 466; 264/119

(56) References Cited

U.S. PATENT DOCUMENTS

| | | | |
|---|---|---|---|
| 4,021,846 | * | 5/1977 | Roese ..................................... 348/57 |
| 4,772,443 | * | 9/1988 | Thorton et al. ....................... 264/119 |
| 4,870,486 | * | 9/1989 | Nakagawa et al. ..................... 348/58 |
| 4,943,852 | * | 7/1990 | Femano et al. ........................ 348/49 |
| 4,953,949 | * | 9/1990 | Dallas .................................. 359/462 |
| 4,959,641 | * | 9/1990 | Bass et al. ............................. 348/59 |
| 5,075,676 | * | 12/1991 | Ando ..................................... 345/52 |
| 5,457,574 | * | 10/1995 | Eichenlaub ........................... 359/619 |
| 5,541,745 | * | 7/1996 | Fergason ............................... 359/619 |
| 5,606,363 | * | 2/1997 | Songer ................................... 348/49 |
| 5,670,970 | * | 9/1997 | Yamazaki .............................. 348/53 |
| 5,815,314 | * | 9/1998 | Sudo ..................................... 348/42 |
| 6,144,404 | * | 11/2000 | Alejo Trevijano ..................... 348/42 |

FOREIGN PATENT DOCUMENTS

| | | |
|---|---|---|
| 136085 | 8/1984 | (EP) . |
| 233636 | 8/1987 | (EP) . |
| 262955 | 4/1988 | (EP) . |
| 2-14697 | 1/1990 | (JP) . |
| WO 9526612 | 10/1995 | (WO) . |

* cited by examiner

*Primary Examiner*—Chris Kelley
*Assistant Examiner*—Gims Philippe
(74) *Attorney, Agent, or Firm*—Klauber & Jackson

(57) ABSTRACT

An electronic stereoscopic system provides registered images to a viewer's left eye and right eye to obtain a three-dimensional view. The system include a parallactic simulation for changing a viewing angle of the pixels of a liquid crystal screen, or another screen having directable pixels, so as to produce the three-dimensional view which does not require the use of filtering or blocking spectacles. The pixels are directable at a rate sufficient to provide a three-dimensional effect without perceived discontinuity. In an embodiment, the rate is equivalent to the frame of a standard television set.

9 Claims, 2 Drawing Sheets

ELECTRONIC STEREOSCOPIC SYSTEM

This Application is a Continuation, of application Ser. No. 08/894,970 filed Sep. 2, 1997, which is a 371 of PCT/ES97/00002 filed Jan. 3, 1997.

OBJECT OF THE INVENTION

As expressed in the title of this specification, the present invention refers to an electronic stereoscopic system, whose purpose consists of providing three-dimensional images upon applying it to the television, cinematographic or other audiovisual means, without the viewer having to use special complementary glasses and without the need of the viewer having to make special visual efforts to perceive the three-dimensional effect of the image.

BACKGROUND OF THE INVENTION

Natural three-dimensional vision is produced by each eye perceiving the image of the objects from a view point slightly different from that of the other eye of a specific person, allowing depths and reliefs to be perceived, after the corresponding integrating and processing of the images in said person's brain.

Different systems in order to adapt three-dimensional images previously registered in a special way, and which try to imitate natural three-dimensional vision, are known.

Since photography and cinematography have come into existence, an infinite number of ways to reproduce and view three-dimensional images has been sought.

The simplest systems consist of taking two simultaneous photographs of a single object from slightly different angles, so that the two lenses of the corresponding cameras have a separation equivalent to that between a person's eyes. Subsequently, once the two photographs are developed they are placed on a plane with an opaque barrier perpendicular to said plane and the viewer brings his face towards this barrier in such a way that his right eye only sees the photograph that corresponds to it and his left eye only sees the other photograph, thus obtaining the three-dimensional effect.

Anaglyphs, that are produced by means of printing stereographs in the form of superimposed images of two complementary colors, for example, red and green, are known. For three-dimensional vision, some glasses with filters of said two colors are used, each one of them over each eye, so that each eye only sees the stereo image that corresponds to it.

On the other hand, there are systems of polarized light in which two beams are projected on a screen, one of them polarized vertically and the other one polarized horizontally, thanks to some filters coupled to the projection lenses. The viewers have to wear polarized glasses whose planes are oriented in such a way that each eye receives only the image that corresponds to it. An example of another system based on polarization is disclosed in EP-A-0233636.

There are also autostereoscopic three-dimensional viewing means, which are those in which the viewer does not need any complementary glasses or viewing device. Among these methods are holographs, which are photographic techniques which use laser light; magic images which are those in which the image is broken down and the three-dimensional effect appears before a specific focus by the viewer; and parallactic stereograms which is the system that is the most similar to the present invention.

In parallactic stereograms, a grating of lines or traces in contract to the emulsion acts as a mask, allowing separate registering of the left and right images as a series of vertical lines. The positive transparency is projected on the screen through a similar grating, in such a way that each eye only sees the appropriate image. A normal grating produces the loss of a large amount of light (805), therefore, almost all the modern systems use gratings formed by cylindrical and fine lenses. Parallactic systems are disclosed in, for example, JP-A-2-14697 and EP-A-262955.

SUMMARY OF THE INVENTION

In order to achieve the aims indicated in the section "OBJECT OF THE INVENTION", said invention consists of an electronic stereoscopic system as claimed that is a type of parallactic stereograph but obtained electronically and achieving a greater image resolution. For this purpose, the invention uses a characteristic of liquid crystal screens. Said characteristic is the possibility of changing the viewing angle of the projected image, by means of varying the voltage in these liquid-crystal screens.

A liquid-crystal screen of the type that portable computers use is comprised of a matrix of thousands of light spots called pixels. The viewing angle of the image that these pixels provide is reduced and their projecting directionalization can be electronically varied by-means of the voltage fed to the same.

If with a liquid-crystal screen the same angles and directions as those of a parallactic system are reproduced pixel by pixel, a three-dimensional effect similar to said system is obtained.

The invention excels the clearness of the parallactic system without reducing resolution from the image. For this purpose, the images of the liquid-crystal screen are directed electronically and successively towards the viewer's right eye and left eye at a rate rapid enough so that said viewer does not perceive the discontinuities.

In terms of the models and brands, 50 to 70 fixed images or frames per second, whose succession gives the sensation of movement, can be generated on the screen of a portable computer. Said frames can be alternately directed, one by one or in small groups, towards the left eye or towards the right eye, which achieves the effect of stereoscopic vision without reducing resolution from the image.

The block diagram of the invention can include a digital image generating system connected to a liquid-crystal screen and to an image synchronization block which in turn connects with said screen through a angle generator system.

The invention is applicable to all types of screens, luminescent or not, monochromic or color screens, as long as they have the viewing characteristics (directable angle) of the liquid-crystal (LCD) screens, such as luminescent, TFT, phosphorescent, electromechanical type screens, etc.

The invention is also applicable to three-dimensional cathode ray tube (CRT) screens of those that most televisions and computers use, and even slide projectors and any other method of image generation in general. Therefore, in front of the television monitor, generated image or the like, a transparent liquid-crystal screen, whose pixels will be directed towards the viewer's right eye and left eye as stated above, is placed. Of course, in this case, the television monitor or generated images must emit stereographic images that will have to be synchronized with the direction that we carry out on the cited transparent screen.

The synchronization between a television, frame and the electronic directionalization towards the left eye or the right eye can be achieved in various ways, but one of great versatility, given that it releases to he transparent screen electrically connected to the television monitor, is the following: the electronic beam that generates the light spots on a CRT screen, begins its exploration in the top left corner and ends in the bottom right corner. By detecting the passing of the last spot of the image, the end of a frame is obtained. This detection may be obtained with a type of optical pencil which upon being activated directs the transparent LCD screen in one direction or the other. This system is valid for distances that do not exceed a distance of 1 or 1.5 meters between the viewer and the television monitor. For larger distances there is the possibility of approaching the LCD screen to the viewer and moving it away from the television monitor, in which case the connection between said LCD screen and the "optical pencil" applied to the monitor can be done by means of cables, ultrasound or infrared rays.

Another solution to direct the pixels of the liquid-crystal screen consists of placing behind it two angularly arranged lenses, placing behind each lens a mask or polarizer and a lamp, in such a way that the illumination of a lamp produces a light beam towards the viewer's left eye and the illumination of the other lamp generates another light beam towards the right eye. In this case, the cited lamps must turn on and turn off alternately and synchronically with the image squares of the screen that are to be directed towards one eye or the other.

Hereinafter, to provide a better understanding of this specification and forming an integral part of the same, some figures in which the object of the invention has been represented with an illustrative and non-restrictive manner are attached hereto.

DETAILED DESCRIPTION OF THE PREFERRED EMBODIMENTS

Hereinafter a description is made of several embodiments of the invention, making reference to the numbering used in the figures.

Figure 1:
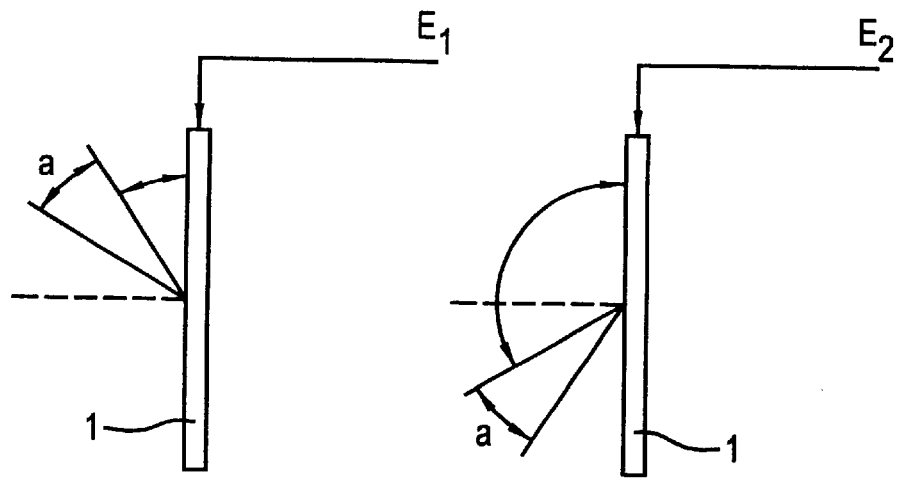
FIG. 1 schematically represents the different viewing angles that a liquid-crystal screen has upon applying different voltages to it, according to the electronic stereoscopic system of the present invention.
Figure 2:
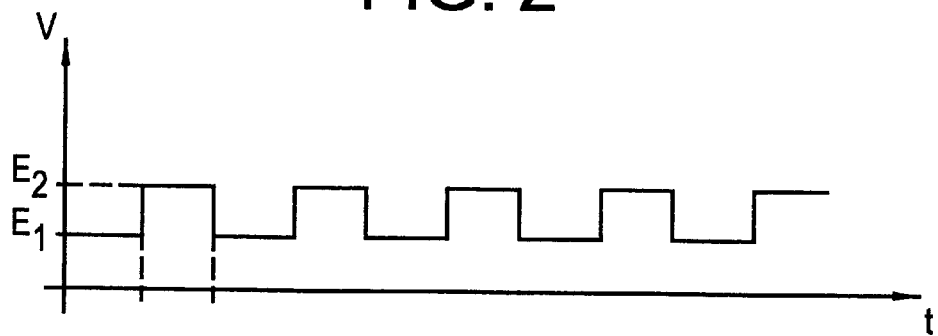
FIG. 2 is a graph of the voltage with respect to the time that is used to feed a liquid-crystal screen of the system of the invention, in order to direct its viewing angle towards the viewer's left eye and right eye, alternately and as required.

Hence, the electronic stereoscopic system of the first embodiment uses a characteristic of liquid crystal screens (1), used in FIG. 1. Said characteristic is that when applying a specific voltage $E_1$ to the screen (1), the viewing angle "a" has a certain slant with regard to said screen (1); while if another voltage $E_2$ is applied to the very same screen (1), said slant varies. Therefore, the visibility of the screen (1) can be directed in terms of the voltage applied, directing it towards the viewer's right eye and left eye alternately. For this purpose, it suffices to apply to the screen (1) a voltage save "V" such as the one shown in FIG. 2, wherein $E_1$ represents the voltage that directs the visibility of the screen towards the viewer's left eye and $E_2$ is the voltage that directs it towards the viewer's right eye.

The times that $E_1$ and $E_2$ are maintained are to be the same and they may cover from a minimum equivalent to one frame or photogram of the visual program up to a maximum equivalent to small groups of said frames or photograms, as long as it is short enough so that the viewer's brain does not perceive the alternation of direction.

In the event that the time $E_l$ and $E_2$ is kept is equivalent to a frame or photogram, the emission or registering of the visual program has to be corresponding, in such a way that a frame corresponds to the stereo image for one eye and the following frame corresponds to the stereo image for the other eye. Likewise, if $E_1$ and $E_2$ are kept for small groups of frames, the emitted images will have to correspond with said small groups. In any case a synchrony between the stereo images emitted and the voltages $E_1$ and $E_2$ applied to the liquid-crystal screen (1) is necessary.

Figure 3:
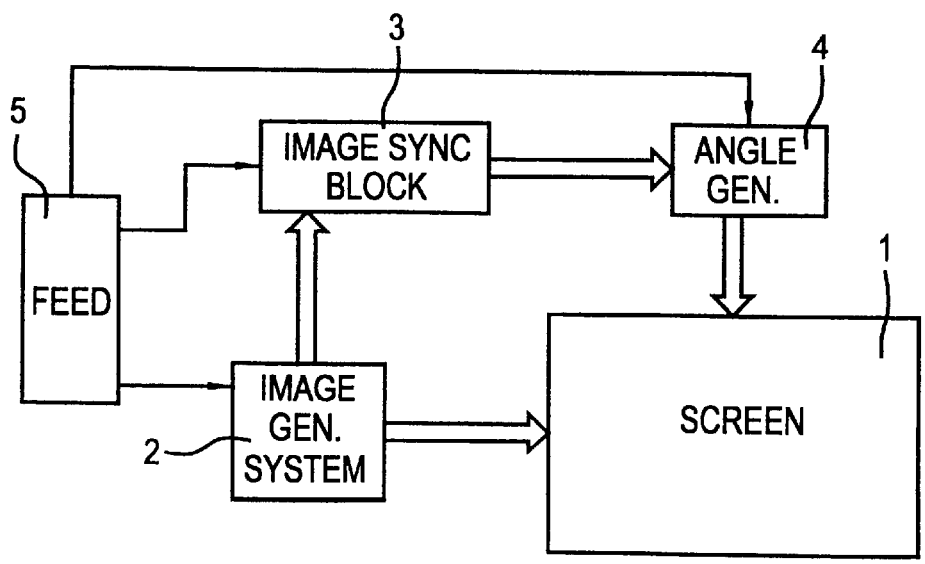
FIG. 3 schematically represents a block diagram of the electronic stereoscopic system of the present invention.

FIG. 3 shows a block diagram that allows said synchrony to be carried out by making the electronic stereoscopic system of the invention operative. In said diagram screen (1) receives the stereo video signal from a digital image generating system (2). This digital system (2) also connects to an image synchronization block (3) which in turn connects to an angle generator system (4). The angle generator system (4) also connects to the screen (1) in order to provide said screen (1) with voltages $E_1$ and $E_2$ in terms of the desired viewing angle, in a way congruent to the stereo image produced by the digital system. (2).

The block (5) represents the feed of the other blocks or systems (2), (3) and (4).

In another embodiment, the invention is applied to a conventional television set (6) of those that include a cathode ray tube screen (7). For this purpose, in front on said screen (7), it is necessary to put a transparent LCD screen (8) whose visibility will be directed by voltages $E_1$ and $E_2$ as stated above.

Figure 4:
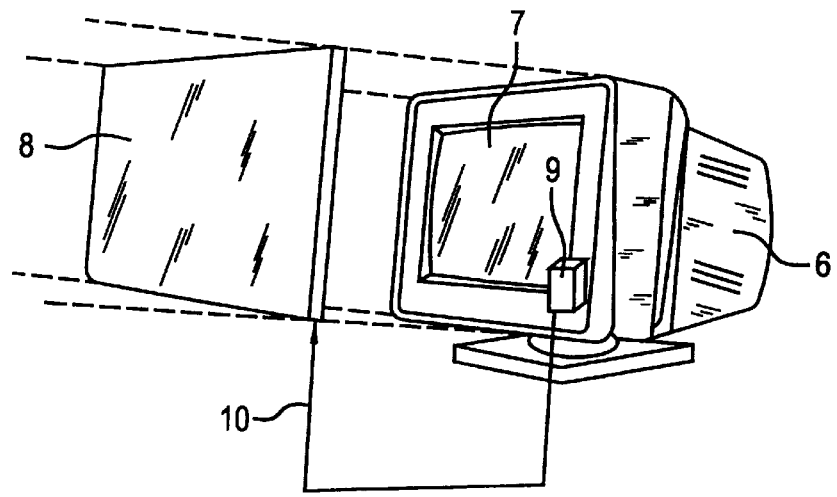
FIG. 4 is a perspective schematic view of a variant of the stereoscopic system of the invention in its application to conventional television sets with cathode ray rube screens.

Logically, the images emitted by the television set (6) have to be stereo ones, in other words, capable of being perceived alternately by one eye or the other during the times that voltages $E_1$ and $E_2$ last. Therefore, a synchrony between the television set (6) and the directionalization of the transparent screen (8) is necessary. This can be carried out without the need of a direct connection between said elements, since a type of optical pencil (9) applied to the bottom right corner of a conventional CRT screen (7) can perceive the end of a frame of said screen (7). In this case, said optical pencil (9) has to have a connection (10) with the transparent screen (8), providing voltages $E_1$ and $E_2$ at the adequate moments, as one can see in FIG. 4. However, said connection (10) aside from being by means of a cable, can be done in a wireless manner by means of infrared rays or ultrasound, thus obtaining a great physical independence of all of the elements that permit different separations of the same. This is especially useful when one desires a larger distance between the viewer and the television set (6), since the system is still valid by simply bringing the transparent screen (8) closer to the viewer.

Figure 5:
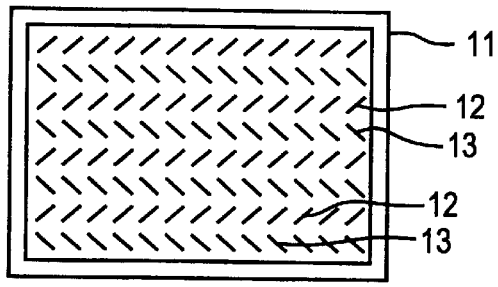
FIG. 5 schematically represents a front view of a special screen wherein its pixels or viewing spots have two different permanent directions, said screen is not claimed but disclosed for information purposes only.
Figure 6:
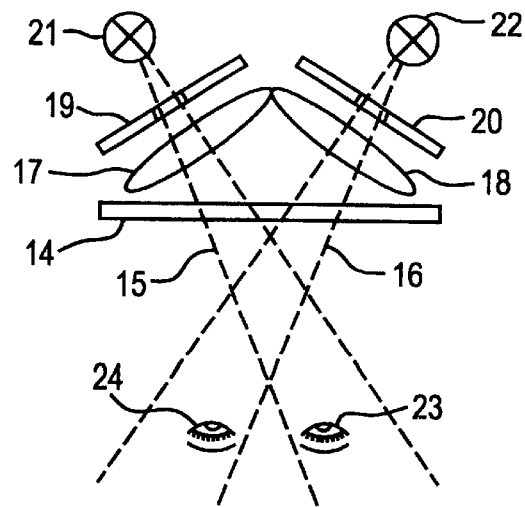
FIG. 6 represents a top plan and schematic view of another image directing means applicable to the electronic stereoscopic system of the present invention.

Another System (not claimed but disclosed for informational purposes only) consists of the screen (11) of the system having its image spots or pixels (12) and (13) permanently directed towards one eye or the other alternately, as one can see in FIG. 5, which is equivalent to two fused screens, one for the left eye and the other for the right eye, each one receiving from said two screens the corresponding stereo image. In this case, the distributions of the spots (12) and (13) with different directionalization must be homogeneous and uniform upon the entire surface of the screen (11) so that there are no irregularities in perceiving the image. The pixels may be LED diodes, light bulbs or ends of optic fiber cable.

The final embodiment that is set forth in this section consists of directing the pixels of one liquid-crystal screen (14) by means of light beams (15) and (16) instead of by voltages $E_1$ and $E_2$. For this purpose, behind the screen (14) there are two lenses (17) and (18) placed angularly and followed by respective masks or gratings (19) and (20 and respective lights or lamps (21) and (22), in such a way that the illumination of one lamp (21) reaches the viewer's right eye (23) and that of the other lamp (22) reaches the viewer's left eye (24). Lamps (21) and (22) turn on and turn off alternately and synchronically with regard to the video squares of the screen (14) that are to be directed towards one eye or the other (23) and (24) in order to obtain the stereo image.

What is claimed is:

1. An electronic stereoscopic system, which alternately sends different images corresponding to previously registered stereographic images towards the viewer's left eye (24) and right eye (23) for the purpose of obtaining a three-dimensional view of previously registered images, wherein said system includes parallactic simulation means for changing a viewing angle of pixels of a liquid crystal screen (3, 4; 17–22) to direct the pixels of said liquid-crystal screen (1, 8, 11, 14), or another screen whose pixels are directable, so as to produce the three-dimensional view of said previously registered images without requiring said viewer to use one of filtering and blocking spectacles, said viewing angle alternating towards the viewer's left eye (24) and right eye (23), at a rate sufficient so that the eyes (23,24) of the viewer perceive a three-dimensional effect without discontinuities.

2. The electronic stereoscopic system, according to claim 1, wherein the directing of images towards one of the viewer's eyes or the other (23, 24) is done successively and alternately in fractions of seconds that correspond to a television frame, file photogram or small groups thereof.

3. The electronic stereoscopic system, according to claim 1, wherein the images are visualized said an liquid-crystal screen (1), and said parallactic simulation means to direct the pixels comprises a viewing angle generator system (4) that is connected to the liquid-crystal screen (1) and wherein an image synchronization block (3) is connected to a digital image generating system (2), which is connected to the liquid-crystal screen (1).

4. The electronic stereoscopic system, according to claim 3, wherein said viewing angle generator system (4) is an electronic circuit which applies, in accordance with the signals received from the synchronization block (3), different potential differences ($E_1$, $E_2$) to the liquid-crystal screen (1) to provide different directioning of the pixels of said screen (1).

5. The electronic stereoscopic system, according to claim 1, further comprising a conventional television set (6) which emits stereographic images, and a substantially transparent liquid-crystal screen (1) arranged in front of a cathode ray tube screen (7) of the conventional television set (6); and the viewing angle of the liquid-crystal screen being arranged to be changed in synchronization with the sequence of images appearing on said cathode ray tube screen (7).

6. The electronic stereoscopic system, according to claim 5, wherein a connection (10) of the liquid-crystal screen (8) with the stereoscopic system is by connecting means selected from the group consisting of ultrasounds, infrared rays, and a long enough cable, said connecting means providing a larger separation of said screen (8) with respect to the cathode ray tube screen (7) of the television set (6) and a larger separation of the viewer with respect to said television set (6) without losing the three-dimensional effect of the perceived images.

7. The electronic stereoscopic system, according to claim 1, wherein said parallactic simulation means for directing the pixels comprises two lenses (17, 18) arranged angularly behind the liquid-crystal screen (14), and a mask or polarizer (19, 20) placed behind each lens, and a lamp (21, 22) placed behind each mask or polarizer, so that the illumination of one of these lamps (22) produces a light beam (16) directed towards the viewer's left eye (24), and the illumination of the other lamp (21) generates a light beam (15) towards the viewer's right eye (23); said lamps (21, 22) being arranged to be turned on and off alternately and synchronously with the image frames displayed on the liquid-crystal screen (14) that are to be sent towards one eye or the other (23, 24) of the viewer.

8. The electronic stereoscopic system, according to claim 5, wherein an optical pencil is positioned in a corner of the cathode ray tube screen in order to detect an end of a frame.

9. The electronic stereoscopic system according to claim 8, wherein a connection of the liquid crystal screen with the stereoscopic system is by means of one of the following selected from the group consisting of ultrasounds, infrared rays, and a cable, said connection providing a larger separation of the said liquid crystal screen with respect to the cathode ray tube screen of the television set, and a larger separation of the viewing with respect to said television set without losing the three-dimensional effect of the perceived images.

* * * * *

UNITED STATES PATENT AND TRADEMARK OFFICE
CERTIFICATE OF CORRECTION

PATENT NO. : 6,288,741 B1
DATED : September 11, 2001
INVENTOR(S) : Jose Javier Alejo Trevijano It is certified that error appears in the above-identified patent and that said Letters Patent is hereby corrected as shown below:

<u>Title page,</u>
Item [76], the Inventor's address should be changed from "Seville" to read -- Sevilla --

Signed and Sealed this

Thirtieth Day of July, 2002

Attest:

Attesting Officer

JAMES E. ROGAN
*Director of the United States Patent and Trademark Office*